United States Patent [19]

Pearson et al.

[11] Patent Number: 4,528,693

[45] Date of Patent: Jul. 9, 1985

[54] APPARATUS AND METHOD FOR SCALING FACSIMILE IMAGE DATA

[75] Inventors: Kenneth A. Pearson, Kingston; Luther L. Zimmerman, Woodstock, both of N.Y.

[73] Assignee: International Business Machines Corporation, Armonk, N.Y.

[21] Appl. No.: 430,228

[22] Filed: Sep. 30, 1982

[51] Int. Cl.³ .............................................. G06K 9/42
[52] U.S. Cl. ...................................... 382/47; 340/731; 340/793; 358/140; 358/287; 382/56
[58] Field of Search .............................. 382/47, 41, 56; 358/180, 140, 287, 283; 340/727, 728, 731, 793, 747, 703

[56] References Cited

U.S. PATENT DOCUMENTS

| | | | |
|---|---|---|---|
| 3,976,982 | 8/1976 | Eiselen | 340/172.5 |
| 4,090,188 | 5/1978 | Suga | 340/324 AD |
| 4,124,871 | 11/1978 | Morrin | 358/287 |
| 4,193,092 | 6/1978 | Stoffel | 340/728 |
| 4,381,547 | 4/1983 | Ejiri | 382/47 |

FOREIGN PATENT DOCUMENTS 0016299 10/1980 European Pat. Off.

*Primary Examiner*—Leo H. Boudreau
*Assistant Examiner*—Joseph Mancuso
*Attorney, Agent, or Firm*—Pollock, Vande Sande & Priddy

[57] ABSTRACT

Apparatus and method for converting image data of an image matrix to an image matrix having a different number of matrix points. Each new image pel has a gray scale determined by considering its position with respect to the nearest neighbors of an original image pel. A look up table is provided having a plurality of planes, each plane including a plurality of storage elements arranged in columns and rows. The storage elements contain the gray scale level of a new image pel. The look up table plane represents the gray scale levels for a plurality of positions within the neighborhood. The planes are addressed by the gray scale levels of the pels comprising the neighborhood, and the storage elements within a plane are addressed by the position of the new pel with respect to the neighbors.

10 Claims, 11 Drawing Figures

FIG. 1
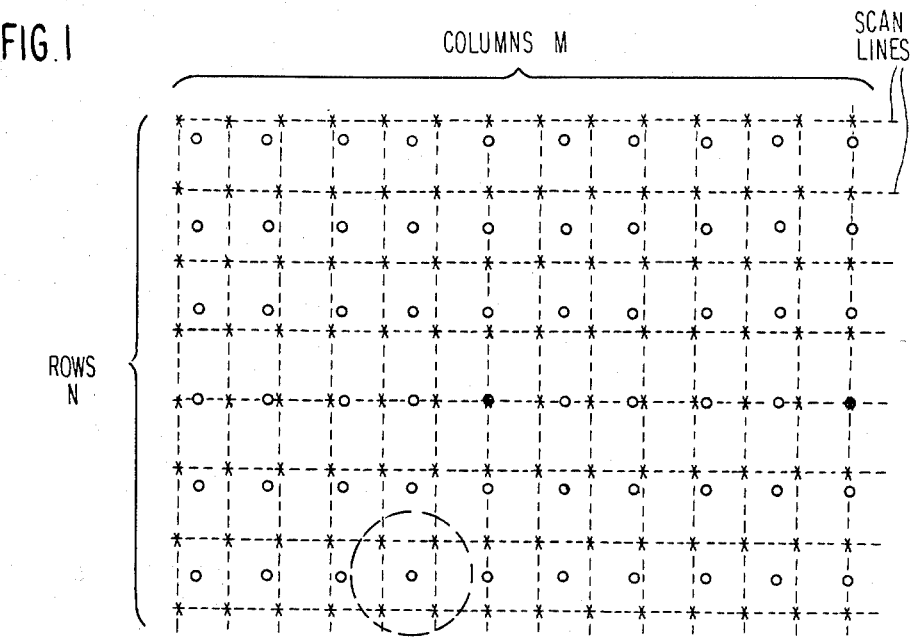
- ASTERISKS ARE THE "s-PELS" FROM ORIGINAL IMAGE – N×M
- CIRCLES ARE THE "t-PELS" THAT WILL CONSTITUTE THE NEW IMAGE – $N_1 \times M_1$
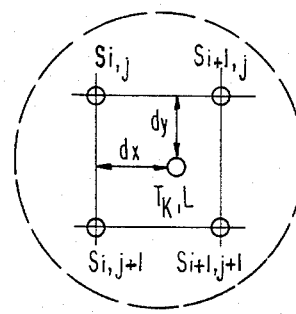
FIG. 2
```
        Si,j                    dx →                      Si,j+1
         ⊥                                                   O
              1    .88  .75  .63  .50  .38  .25  .13
             .88  .78  .69  .59  .50  .41  .31  .22
             .75  .69  .63  .56  .50  .44  .38  .31
             .63  .59  .56  .53  .50  .47  .44  .41
     dy      .50  .50  .50  .50  .50  .50  .50  .50
             .38  .41  .44  .47  .50  .53  .56  .59
             .25  .31  .38  .44  .50  .56  .63  .69
             .13  .22  .31  .41  .50  .59  .69  .78
         O                                                   ⊥
        Si+1,j                                             Si+1,j+1
```
FIG. 3A

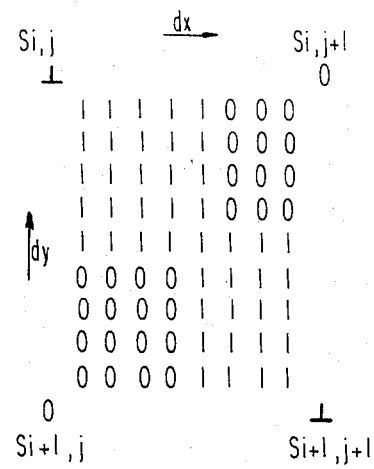
FIG. 3B
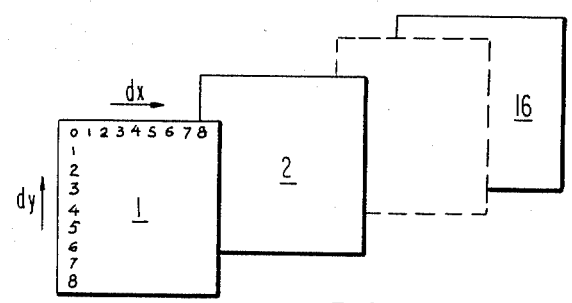
FIG. 3C
LOOK UP TABLE RAM
FIG. 4
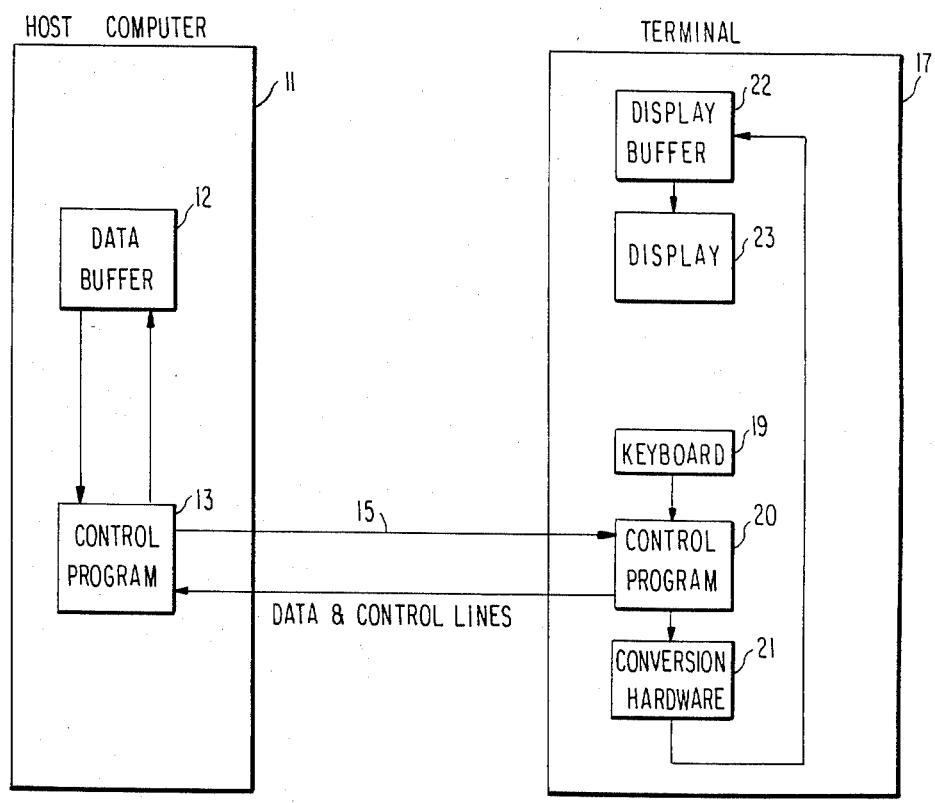

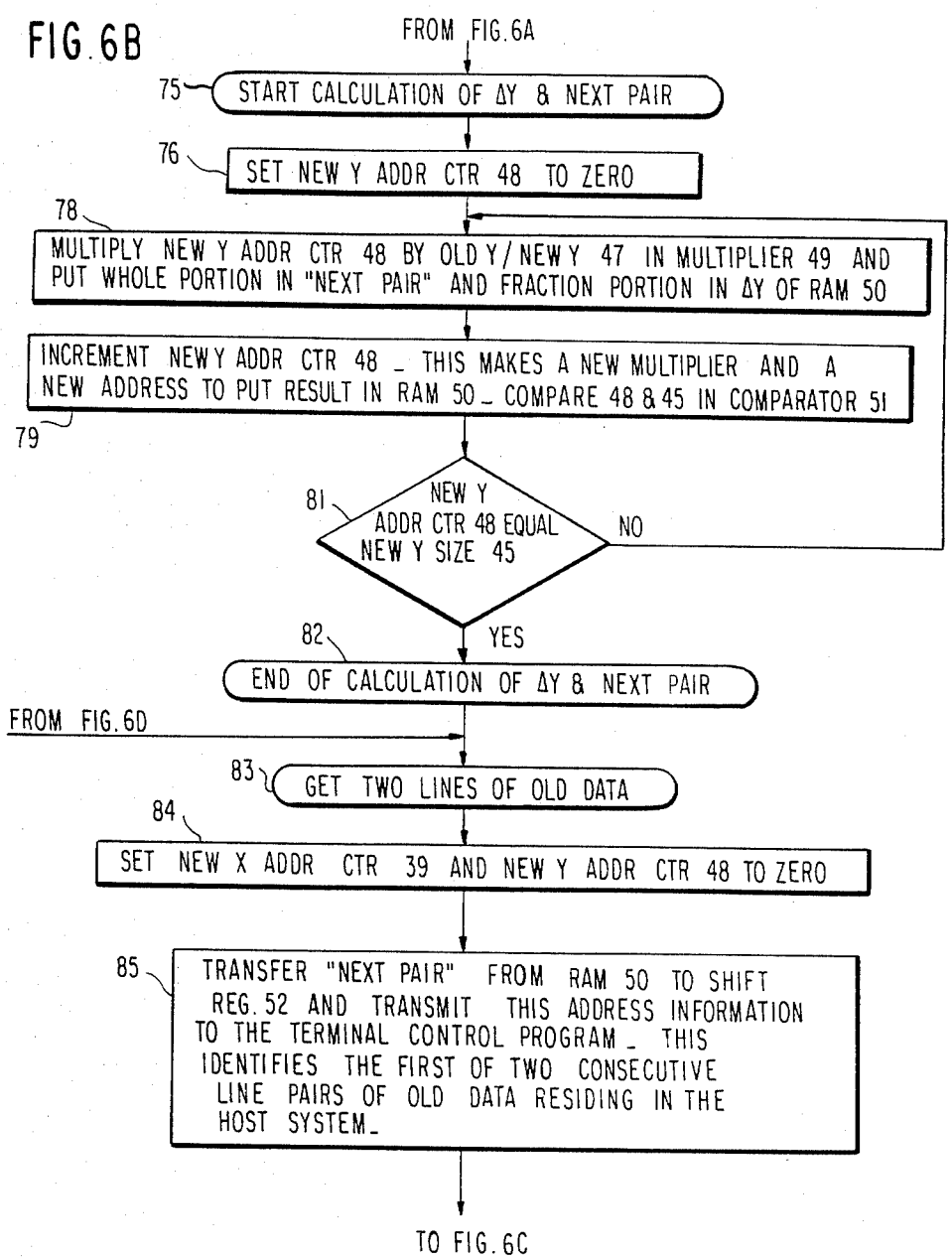

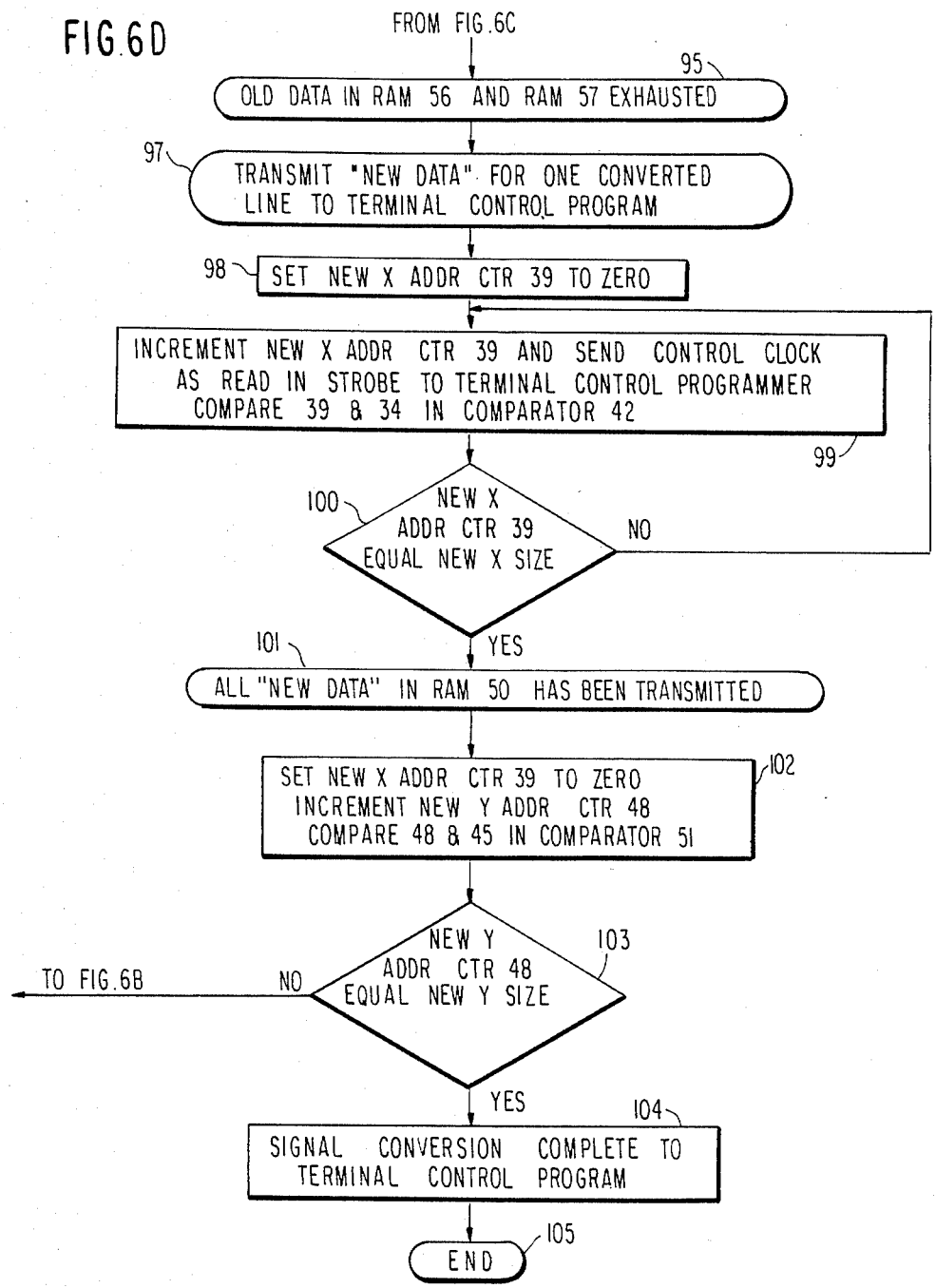

APPARATUS AND METHOD FOR SCALING FACSIMILE IMAGE DATA

Apparatus and method which converts image data of a first image field to data of a second image field having a different size is described. Specifically, conversion of matrix image data from a first two dimensional matrix to a different sized matrix is provided.

Computer users of on line displays frequently access image facsimile data which occurs in scanned lines. A number of picture elements or pels, each representing the gray scale of a point in an image are generated at a regular time interval, depending on the scanning frequency used to form a scan line. The ICCTT standard prescribes numbers of pels per inch suitable to produce adequate clarity. The pels are data specifying a particular gray scale of each point in the image, and each scan line forms a row of pel data in a matrix. The individual pels of a plurality of scan lines of pels form columns, the columns and rows constitute a matrix of N rows and M columns. The matrix is stored in memory and supplied to a user for display when required.

Displays and printers used in connection with large scale computer systems typically require image data which is comprised of a smaller number of pels extracted from a larger image matrix containing more pels. The conversion process should reduce the matrix of pels from $N_1 \times M_1$ to $N_2 \times M_2$ with a minimum loss in picture detail.

The process of converting one matrix of image data to another different sized matrix of image data has in the past involved computation of a gray scale for each new pel with an alogrithm controlled processor. In one such alogrithm the processor calculates the gray scale level of the new pel considering the contribution of gray scale level from the pels of the original matrix which constitutes the four nearest neighbors to the new image pel as:

$$G_t(K,L) = G_{i,j}(1-dx)(1-dy) + G_{i,j+1}(dx)(1-dy) + G_{i+1,j}(1-dx)(dy) + G_{i+1,j+1}(dx)\,dy$$

where dx, dy, are the distances of the new picture pel Gt to the upper left neighbor $G_{i,j}$. $G_{i,j+1}$; $G_{i+1,j}$; and $G_{i+1,j+1}$ are the gray scale levels for the remaining neighbors of the new image pel.

The process of calculating each new pel gray scale level from the old image pel neighbors consumes considerable processor time. The image quality and speed of computation vary inversely, and the number of required computations may slow the processor beyond the point of acceptability.

SUMMARY OF THE INVENTION

It is an object of this invention to provide an apparatus and method for changing the number of pels in an image field to an image field of a different number of pels.

It is a primary object of this invention to reduce the number of pels in an image field to a smaller number comprising a new image field.

It is another object of this invention to provide conversion of an image from one size to another size with a minimum loss of information and with increased speed.

These and other objects are accomplished by apparatus and methods in accordance with the invention. Image field data is converted from a first matrix of pels having dimensions $N_1 \times M_1$, to a second matrix of image pels of dimensions $N_2 \times M_2$, where at least one of the dimensions of one image are different from the corresponding dimension of the remaining image.

To carry out the invention, two simplifications are imposed upon the preceding calculation. Gray levels of the original image are restricted to 0 to 1, and the distance dx, dy are rounded to the nearest ⅛. The original image pels which form the nearest neighbors of the new image data are identified, as well as the position of the new pel with respect to each neighbor. A look up table is provided which is addressed according to the gray scale of each neighbor pel and the position of the new pel within its respective neighborhood. By gray scale, it is intended to cover the situation wherein each original image pel is represented by one of two gray scale levels only, which is either 1 or 0. The look up table comprises a memory organized in planes, each plane containing addressable rows and columns of storage cells. Each plane corresponds to one of a plurality of gray scale combinations of each neighborhood. The position of each storage cell within a plane represents the position of the new pel with respect to each neighbor. Thus, by addressing a plane representing the gray scale levels within a given neighborhood, and further addressing a position within the represented neighborhood, the gray scale of the new pel is determined.

In a preferred embodiment of the invention, method and apparatus are provided to calculate scale factors for changing one image field matrix to another sized image field matrix. One scale factor is used in conjunction with the address of each new pel to identify pairs of pel rows in the original image field matrix which contain neighbor pels of the new scaled image pels, and a position coordinate within the neighborhood of the new pel. The neighbor pels contained in the pairs of rows are identified by calculating column addresses from another of the scale factors, and a second position coordinate of each new pel with respect to the identified neighbors is also determined.

The gray scale of the identified neighbors are each used to locate one of a plurality of planes of a look up table containing a plurality of storage elements. The storage elements within the planes are arranged in rows and columns, for storing data. The address of each storage element in a plane corresponds to the previously determined position coordinates of a new pel within the neighborhood of the original image pels. When addressed in accordance with the determined position of the new pel within the old image neighborhood, data representing the gray scale of the new pel is produced.

DESCRIPTION OF THE FIGURES

FIG. 1 is illustrative of an image matrix of NXM pels, superimposed on a smaller $N_1 \times M_1$ matrix of fewer pels.

FIG. 2 is illustrative of the relationship of a neighborhood of original image pels with respect to a pel of a reduced image having fewer pels.

FIG. 3A is illustrative of a plane of a look up table containing gray scale data for a new pel of an image.

FIG. 3B is illustrative of a plane of a look up table including binary representations of gray scale data for a new image pel.

FIG. 3C illustrates the organization in planes for a memory serving as a look up table of the planes of FIG. 3B.

FIG. 4 is a block diagram of apparatus for illustrating the use of the invention in one application.

FIGS. 6a–6d are flow charts illustrating a method implementing the conversion of image data from a first image size to a second image size.

DESCRIPTION OF THE PREFERRED EMBDODIMENT

Figure 5:
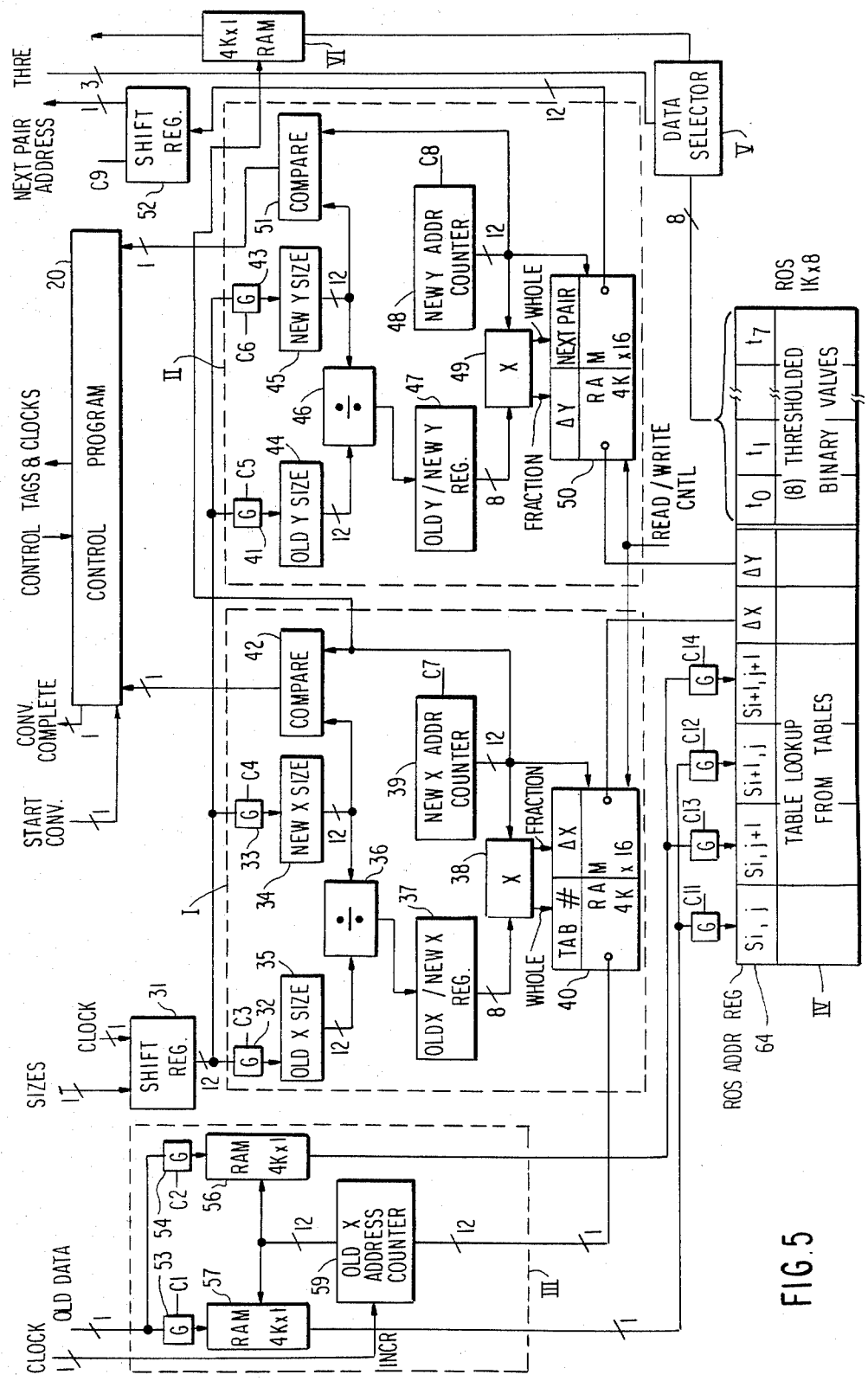
FIG. 5 is a detailed block diagram of conversion apparatus of one embodiment of the present invention.

Referring now to FIG. 1, there is shown the position of each pel in a scanned image field of the type specified in ICCTT standards which prescribe the number of pels per inch for each scanned line. In the simplified example shown a scan line consists of 14 pels identified by *; the number of scan lines is 8. Those skilled in the art will recognize this to be a rudimentary example of a image field specified by 8 rows and 14 columns i.e. a matrix of 8×14. Each pel is represented by the data specifying the gray scale or intensity of a point in the image. The pel is represented by a binary number which may be a single digit in the example to be described as either 0 or 1, 0 corresponding to a black level and 1 to a bright, intensity level.

Superimposed on the orginal image field of FIG. 1 is a second image field comprising fewer pels than the first identified by 0. The pels shown in the new image field are surrounded by the original image field pels, *.

Referring to FIG. 2, it is seen that each new pel $T_{k,L}$ is surrounded by four neighbors of the old image matrix, $S_{i,j}$; $S_{i,j+1}$; $S_{i+1,j}$; and $S_{i+1,j+1}$. The image intensity of the new pel $T_{k,L}$ is a function of the position of the new image pel $T_{k,L}$ within the neighborhood of old image pels and the intensity of the neighbor pels. The aforementioned algorithm provides a means for calculating the new pel gray scale level as a result of considering the old image neighborhood pel gray scale level.

The present invention provides for a convenient method, involving only a minimum amount of computation time, for assigning a new gray scale level to a new image pel constructed from the gray scale levels of four neighbors of an old image field, and the position of the new pel with respect to the old image neighbors.

Referring to FIG. to 3A, there are shown representative values of the gray scale contributed by the members of the old neighborhood pels of the image to be converted. There is shown in FIG. 3A, an 8×8 matrix of gray scale levels, which corresponds to distances dx or dy, within a neighborhood of pels identified by 1, 0, 0, 1. The distance dx represents 8 separate possible positions in the horizontal direction within the neighborhood. The distance dy represents 8 posssible positions in the dy direction.

It is thus seen, from viewing FIG. 3A that the gray scale level for each point within the neighborhood of FIG. 3A, may be conveniently determined and represented as a grey scale level identified by its position within the matrix for a given neighborhood.

The values of gray scale shown in FIG. 3A may be rounded for convenience whereby values of 0.5 or greater are indicated to be a binary 1, and values of less than 0.50 are binary 0. Thus, FIG. 3A may be modified to that shown in FIG. 3B, wherein the gray scale of a point within the neighborhood having four neighbors with gray scale levels of binary 1, 0, 0, and binary 1 may be represented by a 1 or 0. Since the neighborhood comprises four pels, each having a binary value of 0 to 1, all neighborhoods may be represented by a total of 16 matrices such as Fig. 3C. Turning now to FIG. 3C, each matrix 3B is considered to be a plane, corresponding to one of sixteen possible neighborhood patterns. The gray scale of a point within any neighborhood so represented, may be determined by considering its distance dx and dy within the plane, rounded to the nearest ⅛. Thus, by ascertaining the value of the four pel neighbors gray scale, and the position of the new pel within the neighborhood, a new gray scale may be determined for the new pel within a neighborhood. The sixteen planes of matrixes representing the sixteen possible neighborhood configurations for the old image data comprise in the present invention a lookup table which may be conveniently addressed to read out the grey scale of a new pel of an image matrix having different dimensions from the original image matrix. The look up table is an addressable memory divided into planes. The planes are addressed by the gray scale levels of a neighborhood, and within each plane, by the values dx and dy.

Referring now to FIG. 4 there is shown implementation of apparatus for converting the image data of a first size from the main frame host computer 11 forwarded by a bus 15 to a different field size. The host computer 11 includes a data buffer 12, and control programmer 13 for controlling traffic to and from the terminal 17. Terminal 17 includes a like control programmer 20 which cooperates with the control programmer 13 to receive and send data to and from the host computer 11.

The terminal 17 is seen to contain a keyboard 19 for permitting user control of the terminal and permitting access to the host computer 11. A display 23 and display buffer 22 cooperate to present generated by the keyboard and received from the data bus 15 for the users information.

Figure 6A:
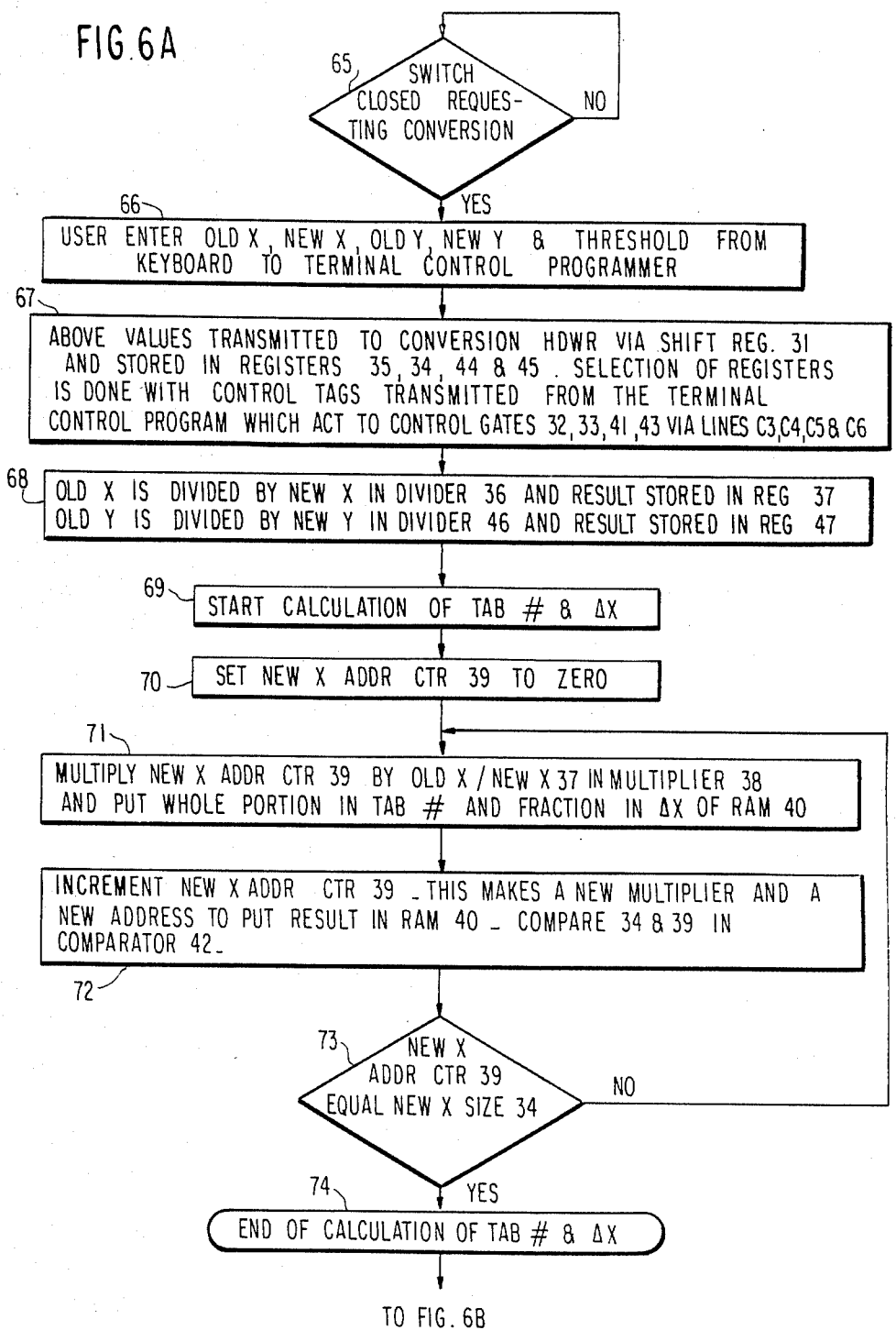
Figure 6C:
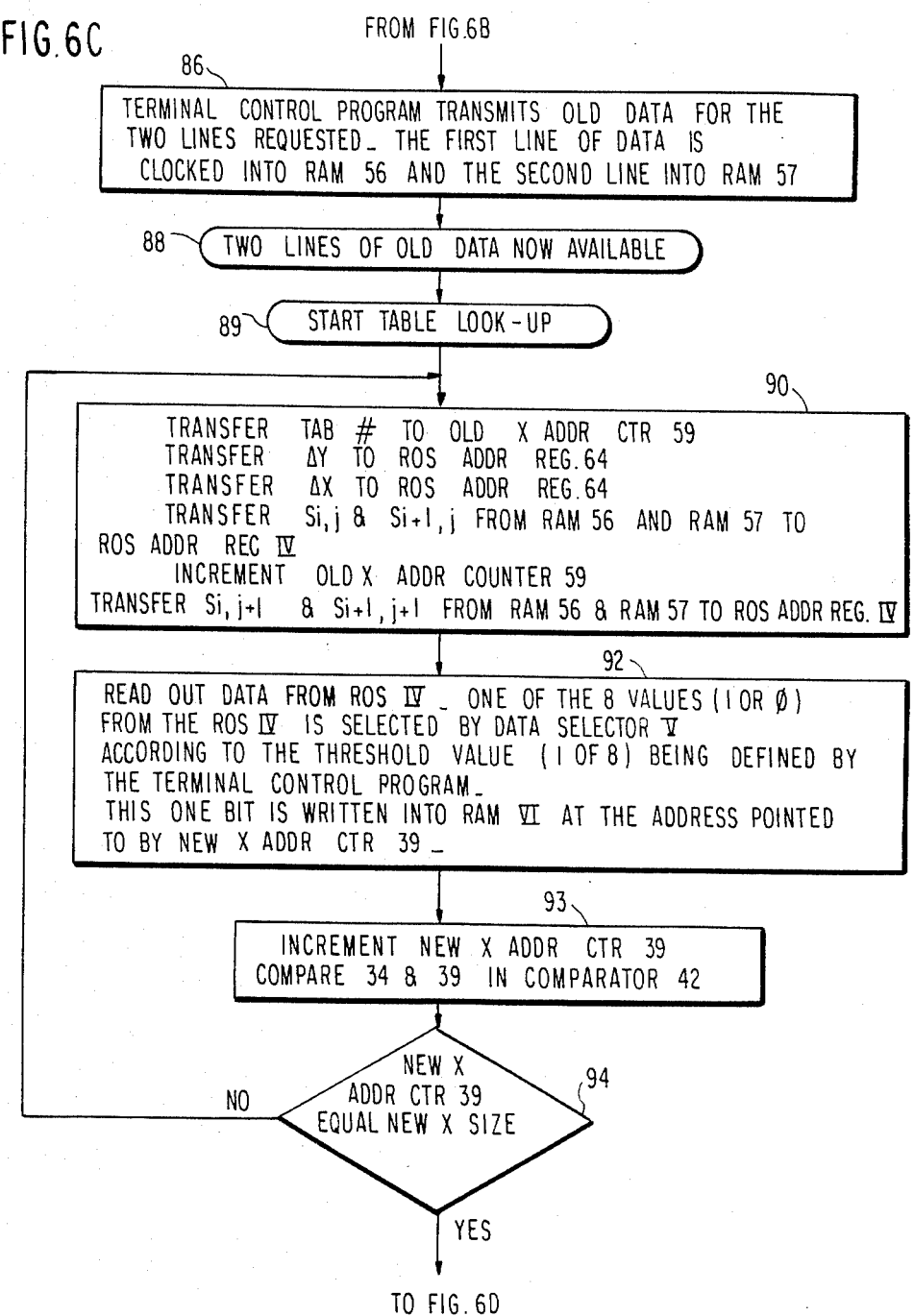

The subject matter of the present invention resides is in conversion hardware 21 which will convert image data received from the data bus 15 from a first field size, containing N×M pels, to a new image field of $N_1 \times M_1$ pels. The conversion hardware 21 is shown more specifically in FIG. 5. In FIG. 5, there is shown the conversion hardware for receiving old image data of a first image size N by M and converting it to the image field having dimensions in $N_1 \times M_1$. The system of FIG. 5 will be described in general terms with respect to the subsystems I–VI. Following the description of these subsystems, an example of the operation of the apparatus will be described with respect to the flow charts of FIG. 6.

Again in FIG. 5, there is shown generally a subsystem I and II. These subsystems respectively compute the location of neighbor pels of the old image field N×M containing the new image pels of the new field $N_1 \times M_1$. Initially there are stored the old X-size, new X-size, old Y-size, and new Y-size dimension of the respective fields in registers 35, 34, 44, 45 within subsystems I and II. Address counters 39 and 48 generate the address of each new pel to be displayed as the new image. Scaling factors are produced to scale the X dimension of the new image data to identify pel neighbors of the old image field which include the new image field pels. Floating point multipliers 38 and 49 will produce the X coordinate and Y coordinates of the neighbors of the old image data containing the new image pel. Two random access memories 40, and 50 store the result of floating point multiplication of the scale factors and the respective X and Y addresses of the new image pels in columns. The result of each floating point multiplication is a whole number and a fraction number. In subsystem II, the whole number identifies the pair of rows in each of the old image data which contains neighbors of each new image pel. The fraction resulting from the floating point multiplication is also stored in the memory 50 which locates the $\Delta Y$ position of the new image pel with respect to the pair of rows identifided by the corresponding whole number.

In subsystem I, memory 40 stores whole numbers shown as Tab # and the corresponding fraction $\Delta X$. The memory 40 identifies the pairs of columns of the old image pels which include a new image pel. $\Delta X$, the corresponding fraction, identifies the position between columns of the new image pel.

Thus, subsystem I and II identify the rows and columns of the old image data which includes the new image pels.

The stored whole numbers in Ram 50, located at addresses in Ram 50 corresponding to the Y address for each new pel, are used to address the stored old image data in data buffer 12, FIG. 4, through shift register 52. The pair of rows identified at each stored address of memory 50 are sequentially inserted through gates 53 and 54 into Rams 56 and 57. Rams 56 and 57, along with address counter 59 and gates 53 and 54 comprise yet another subsystem III. The subsystem of III holds the pels of the identified row pairs, addressed by the shift register 52 until four neighbors, of each neighborhood in the pair of rows, have been identified and the gray scale contribution of the neighbors to the new image pel contained within the neighborhood have been identified. Once the pair of old image data rows have been loaded in Rams 56 and 57, address counter 59 addresses each colum of old image pels in Rams 56 and 57 which are identified in memory 40. The output from Rams 56 and 57 comprise the neighbors $S_{i,j}$ $S_{i+1,j}$ and $S_{i,j+1}$, $S_{i+1,j+1}$. The image data gray scale levels received from Rams 56 and 57 address one of the plurality of planes contained in the look-up table IV. As each neighborhood is addressed in Rams 56 and 57, and the corresponding gray scale of individual neighbors produced for addressing a plane, the $\Delta X$ and $\Delta Y$ values representing the position of each new image pel in a neighborhood identifies within the plane so addressed the position of the new pel with respect to the old image neighbor pels. Therefore, the look-up table produces a stored gray scale level having a gray scale which is proportional to the gray scale of the four individual old image neighbor pels, and the position of the new image pel within the neighborhood.

Look-up table IV has associated with each memory location thereof eight binary values T-0 through T-7. the eight binary values representing a gray scale level are applied to data selector v. Data selector V is under control of yet another threshold which is a three bit code used to select one of the T-0 through T-7 known values. In this way weighting of the produced gray scale is possible such that the number of binary 1 values in the resulting image may be varied. Ram VI will assemble for each neighborhood read from Rams 56 and 57 a new image pel gray scale level until one scan line is produced.

The control program 20 provides for the necessary signals to the different circuit components of FIGS. 6 to effect the foregoing operation. The system will now be described in terms of the actual steps carried on by the controlled programmer 20 to convert image data of a first size to a second size.

Referring now to FIGS. 6a-6d as well as FIG. 5, there is shown the flow chart of the steps carried out by the apparatus of FIG. 5. The initial step 65 includes a determination that the keyboard 19 has selected a request to convert the image data from data buffer 12 to an image of a different size. The user enters from keyboard 19 in step 66 the old and new dimensions of the image data. Alternately, such operator input could be supplanted by suitable programming so that the operation could occur automatically. The sizes of the respective image fields are loaded in shift register 31. Shift register 31 is clocked by pulses from the control programmer 20 to serially produce each of the old image X size, new image X size, old image Y size, and new image Y size in serial fashion. Gates 32, 33, 42 and 43 are controlled by the control tags from the control programmer 20 to gate at the appropriate time the respective image dimension to one of registers 35, 34, 44 and 45.

Once the image sizes reside in the registers, dividers 36 and 46 produce scaling factors by dividing the old image size dimensions by the new image size dimensions in step 68. The result of the scale factor calculations for each coordinate of the matrices are stored in registers 37 and 47 respectively. Address counters 39 and 48 are clocked by the control programmer 20 to generate sequentially the address of each of the new image pels of the new matrix. In steps 69–72 the scale factor contained in register 37 is multiplied by each of the new pel X addresses and the result is a whole number and a fraction, identified as Tab # and $\Delta X$ respectively. The result of the multiplication is stored at an address identified by the new X address counter 39 in RAM 40. As was mentioned previously, at the conclusion of multiplying all of the new pel X addresses by the scale factor, memory 40 will contain Tab # at each new pel X address identifying the pair of columns of the old image data which form neighbors of the new image pel. When the address counter 39 has produced an address equal to the new X size as stored in register 34, the calculation of Tab # and $\Delta X$ coordinates is terminated in step 74. Thus, it is seen that step 71 through 74 complete the calculation of Tab # and $\Delta X$ coordinates for each new pel of the new image field and store the result in memory 40.

The program controller 20 provides a subsequent set of control signals for calculating the pairs of rows of old image data, NEXT PAIR and the $\Delta Y$ coordinate of each new pel within the old image data in steps 75 through 81. The new Y address counter 48 is set to 0 in step 76. Each of the subsequent Y addresses produced in response to clock pulses C8 are multiplied by the scale factor contained in register 47 by floating point multiplier 49. When the new Y address counter 48 has incremented to an address having a width of the new Y size contained in register 45, comparator 51 will terminate the calculation of $\Delta Y$ and the next pair whole number, NEXT PAIR. Memory 50 contains at each new Y address the respective NEXT PAIR rows of old image data which constitute neighbors, and the position within the rows $\Delta Y$ of the new image pel.

In step 82, the complete calculation of each new Y address of NEXT PAIR and $\Delta Y$ is completed.

Now that both memories 40 and 50 contain the identification of the columns and rows of the neighbors of the old image data for each new image pel, the first pair of lines of old image data is in step 83 identified by referring to the first memory location in memory 50. The NEXT PAIR identified in memory 50 is inserted in shift register 52 in step 85. Shift register 52 transmits the address information to the terminal control programmer 20. The control programmer 20 calls forth the proper two consecutive lines of old image data residing in the host computer system 11 which includes neighbors of the new image pel. The control programmer 20 transmits the pair of lines requested into Rams 56 and 57. Ram 56 contains the first of the pair of lines and Ram 57 contains the second of the pair of lines. In step 88, the two lines of old image data which contain neighbors of the new image pel are thus available.

The further identification of the neighbors begins in steps 89 and 90, wherein each Tab # in the Ram 40 identifies the columns of neighbors stored in Rams 57 and 56. Old X address counter 59 addresses these columns of neighbors as each Tab # is read out from memory 40. The output of Rams 57 and 56 therefore contain the image pels comprising neighbors $S_{i,j}$ and $S_{i+1,j}$. The old X address counter 59 is incremented by 1 and the neighbors $S_{i,j+1}$, and $S_{i+1,j+1}$ are read from the Rams 56 and 57.

Thus, the four neighbors of a new pel are identified, and applied through gates under control of program controller 20 to the look-up table 4. Look-up table 4 is arranged in planes, one of the planes being identified by the gray scale of the four neighbors. The individual planes of the look-up table 4 are further addressed by $\Delta X$ and $\Delta Y$ which identify the positin of each new pel within the neighborhood of pels addressing the plane. In step 92, the eight possible binary values produced from the look-up table are selected by data selector V under control of the control programmer 20. A threshold value is used to discriminate against gray scales above and below a predetermined number, between 0 and 1, which may be set by the operation via the keyboard, a potentiometer or switch, or by a program. The result from the data selector V is one of eight possible gray scale levels which is stored in Ram VI as the gray scale of a pel. Ram VI under control of the address counter 39 will for each new X address produced, which has indentified the neighborhood of a pel, store the gray scale level at the new X address. In step 93, the loading of Ram VI is found to be complete when the new X address counter has an X address which is equal to the new X size.

The decision block 94 when determining that the last new pel X address has been generated and a corresponding gray scale for a pel at the address identified is stored in Ram VI, indicates that the data in Rams 56 and 57 has been completely processed. The line of new image pels assembled in Ram VI is transmitted to the terminal control programmer 20 for use by the display buffer. The new address counter is set to 0 in step 98, and then incremented in step 99. In decision block 100, the new X address is compared with the new X size, and the X address counter 39 is continued to be incremented until the decision block 100 provides a yes indication.

At this time, step 101 indicates that all the new data in the Ram VI has been sent to the program controller, and in step 102 the new X address counter 39 is reset to 0. The new Y address counter is incremented and once again compared with the Y dimension of the new image matrix. If there is not an equivalence found, further Y addresses are produced, and the flow chart returns to step 83 to get two more lines of old data for storage in Rams 56 and 57. The process is completed when both the Y counters and X counters have completely addressed every new pel in the new image field, and Ram VI has assembled each of the lines of the new image field and transmitted the same to the program controller for the users display buffer. A signal indicating that the data has been completely converted is produced in step 104 for use by the control programmer.

Thus, it is seen that the hardware of FIG. 5 is under control of control programmer 20 in the sequence described in the foregoing flow chart to do the following: (1) identify the pairs of rows of old image data containing neighbors of the new image pels; (2) calculate the columns of the pairs of rows so identified which contain new image data, call forth the old image data rows in pairs which contain the neighbors, (3) address a look-up table to identify a plane having an address constituting the gray scale level of each neighbor, (4) identify the position within the plane of the new image pel gray scale, and (5) thence producing the gray scale level for the identified image pel from the look-up table, the result being assembled in a Ram VI. This sequence is repeated for each pair of rows of old image data each time generating a faster line for the new image.

Thus, it is seen that by using a look-up table considerable computation time is saved when image data is produced. Those skilled in the art will recognize yet other embodiments of the invention defined more particularly by the claims which follow.

We claim:

1. An apparatus for converting image data of a first field to a second field of different size comprising:
   means for supplying a plurality of sequential lines of image data, each of said lines comprising a row of equally spaced data identifying a gray scale level of each picture pel of said image data;
   a memory for storing the number of said sequential lines in said first field, the number of pels per line, the number of pels per line in said second field, and the number of lines in said second field;
   means connected to said memory for dividing the number of pels per line in said fields and the number of lines in said fields whereby first and second scale factors are produced;
   floating point multiplier means for multiplying said first and second scale factors by each X address and Y address, respectively, of said second field of image data;
   a second memory for storing the whole numbers and fractional numbers which result from said multiplication, as TAB # and $\Delta X$, and NEXT PAIR and $\Delta Y$, respectively, for each new X address and Y address, respectively;
   a third memory for sequentially storing first and second lines of said first image field identified by said NEXT PAIR;
   means for reading out of said third memory the data points of said first and second lines identified by said TAB #;
   a look up table including a plurality of planes, each plane containing a plurality of storage locations identifying a gray scale level for a picture pel;
   means for addressing a plane of said stored lookup table, at an address specified by said readout data points, and a location within said plane by remainders, said $\Delta X$ and $\Delta Y$, to produce a gray scale corresponding to a pel of said second field, whereby successive new X addresses, and Y addresses are multiplied by said first and second scale factors to identify additional whole numbers identifying neighbors of data points of said first field which contain a picture pel of said second field, said neighbors and remainders $\Delta X$, $\Delta Y$, addressing said lookup table having an associated gray scale at said address locations.

2. A machine method of generating a second picture field from a first picture field of a different size comprising:

receiving a series of sequential picture lines including a series of picture pels defining X rows and Y columns of a matrix; dividing the number of rows of the first picture field by the number of rows of the second picture field, and columns of the first picture field by the number of columns of the second picture field to provide a first multiplier and a second multiplier, respectively;

generating serially the X and Y coordinates for each pel of said second field;

multiplying each X coordinate of pels of said second picture field by said second multiplier and each Y coordinate of said second picture field by said first multiplier, whereby first and second products are produced consisting of a whole number and remainder portion;

identifying a pair of said sequential picture lines identified by each whole number produced by said second product;

addressing pels of said identified pair of lines with each whole number produced by said first product; and determining from a lookup table a gray scale level identified by said addressed pels and said remainder portions, whereby a gray scale of a corresponding pel of said second field is identified for each of said X and Y coordinates.

3. The method of claim 2, wherein said look up table is a memory comprising a plurality of planes identified by the gray scale of the pels of said neighborhoods, each of said planes comprising a plurality of storage elements which contains data defining a gray scale of one of a plurality of points within said neighborhoods, identified by said remainders.

4. A method for converting a first picture field to a second picture field, wherein said fields are of a different size, comprising:

receiving a series of lines containing picture pel gray scale data, said data forming rows and columns of a matrix having dimensions $M_1 \times N_1$;

dividing said dimensions $M_1 \times N_1$ by the dimensions of said new field $M_2 \times N_2$ whereby first and second quotients $M_1/M_2$ and $N_1/N_2$ are produced;

generating addresses for each pel in said second picture field;

multiplying said quotients with said second picture field pel addresses to obtain a whole number identifying a neighborhood of pels containing each of said second picture field pels, and a remainder of said multiplication identifying a coordinate distance dx, dy within each neighborhood identifying the location of each new pel within said neighborhood;

storing in a lookup table gray scale data for each new pel of said second picture field, said table organized in planes identified by the gray scale of the pels of one of said neighborhoods, each of said planes containing stored data comprising the gray scale level at coordinates dx and dy with said neighborhood; and addressing a plane within said lookup table with the combined gray scale of each of said neighborhoods, and addressing within each addressed plane a gray scale level identified by dx and dy, whereby gray scale data of each pel of said new picture field is produced in the form of a serial data stream constituting said second picture field.

5. A machine method for converting old images formed as a $M_1 \times N_1$ matrix of gray scale data into new images having different matrix dimensions $M_2 \times N_2$, comprising:

generating scaling factors from said matrix dimensions as $M_1/M_2$ and $N_1/N_2$, and multiplying said scaling factors with the address of each new image pel to obtain a whole number TAB, with a remainder dx, and whole number NEXT PAIR with a remainder dy;

each of said TAB and NEXT PAIR numbers identifying a neighborhood of pels of old image data contained in said $M_1 \times N_1$ matrix which contains a pel of new image data contained in said matrix $M_2 \times N_2$, and each of said remainders dx, dy identifying a position within each neighborhood of pels of said new image pel;

addressing a lookup table with a gray scale of the pels comprising each of said neighborhoods and said dx and dy remainders, whereby a plane containing gray scale data for a plurality of locations within said neighborhood is addressed, and a gray scale of said plane is identified by dx and dy;

whereby gray scale data for each new pel of a new image is produced by looking up said data as a function of the gray scale of old image pels constituting a neighborhood for said new pel, and the position of each said new pel dx, dy, within said neighborhood.

6. An apparatus for converting rows and columns of old image data of first dimensions $N \times M$, into new image data of second dimensions $N_1 \times M_1$ comprising:

divider means for providing quotients of $N/N_1$ and $M/M_1$;

an address generator for generating x and y coordinates of each pel of said new image;

multiplier means for forming first and second products from multiplying each of said x coordinates by $M/M_1$, and each of said y coordinates by $N/N_1$;

means for storing said first product as a whole number TAB # and remainder dx, and for storing said second product as NEXT PAIR and dy, respectively;

means for sequentially storing first and second rows of old image pel data identified by each NEXT PAIR result;

means for addressing each pel of said sequentially stored first and second rows identified by said TAB # result whereby neighborhoods of old image pels are produced containing new image pels, said new image pels having a position within said neighborhoods defined by said remainders dx, dy;

a lookup table for storing gray scale data for said new image data, said table including a plurality of planes, each plane having columns and rows of storage locations, each of said planes corresponding to the gray scales of a neighborhood of old image pels, each storage element within said plane including the gray scale data of a point within said neighborhood;

means for addressing said lookup table with said old image neighborhood pel gray scale data produced by each TAB # result whereby a plane of said lookup table is selected; and means for addressing a memory location of each addressed plane by said dx and dy remainders, whereby gray scale data for pels of said new image are produced.

7. The apparatus of claim 6 further comprising:

additional lookup tables, containing weighted picture pel data, said lookup tables having common address inputs; and means for selecting one of said lookup tables for permitting only data from said selected table to form pels of said new image.

8. The apparatus of claim 7 further comprising:

a data selector connected to receive data from said lookup tables, said data selector connected to receive a threshold detection signal for selecting pel data which represents a predetermined threshold level.

9. The apparatus of claim 6 comprising a serial register for receiving said lookup table data representing pels of said new image and assembling said data in a line format.

10. An apparatus for converting data of an original image comprising a series of image pels represented by a gray scale level which forms a matrix into a new image comprising a plurality of points of a different sized matrix, said apparatus comprising:

a size register for receiving data dimensions $N_1 \times M_1$ of said original image matrix and data dimensions of said different sized matrix $N_2 \times M_2$;

an x coordinate address register for generating address locations identifying columns of pels of said new image matrix;

a y coordinate address register for generating address locations identifying rows of said pels of said new image matrix;

a divider for forming first and second quotients $N_1/N_2$ and $M_1/M_2$ from said dimension data;

first and second floating point multipliers for receiving first and second quotients from said divider, and data from said x coordinate register and y coordinate register, respectively;

first and second random access memories for storing first and second rows of said data of said original image;

a third random access memory for storing a product from said first floating point multiplier including a whole number and remainder;

a fourth random access memory for storing the result from said second floating point multiplier as a whole number and a remainder;

said third and fourth memories holding for each new pel addressed by said address registers an identification of the column and rows of said data of said original image which contain neighbors of said new image pels;

means for addressing said neighbors, including means for reading out of said third and fourth memories the location of each pair of rows containing said neighbors and loading each of said pairs into said first and second random access memories, and addressing said loaded row pairs with whole numbers from said third memory, whereby said first and second memories produce gray scale data of said neighbors; and a lookup table addressed by said gray scale data, said table having a plurality of planes, each identified by the gray scale of said neighbors, said planes having rows and columns of storage elements representing the distance of a new image pel from said neighbors, said storage elements being addressed from said remainders contained in said third and fourth memories.

* * * * *